United States Patent [19]

Shinbrot

[11] Patent Number: 4,663,873
[45] Date of Patent: May 12, 1987

[54] PAGE FLIPPER FOR BOOK COPYING

[75] Inventor: Troy Shinbrot, Greenbelt, Md.

[73] Assignee: Xerox Corporation, Stamford, Conn.

[21] Appl. No.: 811,194

[22] Filed: Dec. 20, 1985

[51] Int. Cl.$^4$ .............................................. G09F 19/00
[52] U.S. Cl. ...................................... 40/531; 84/487; 40/346; 40/475
[58] Field of Search ................. 40/346, 531, 475, 343; 84/486, 487

[56] References Cited

U.S. PATENT DOCUMENTS

| | | | |
|---|---|---|---|
| 1,649,448 | 11/1927 | Cutler | 40/531 |
| 1,689,106 | 10/1928 | Boyd | 40/151 |
| 2,484,106 | 10/1949 | Mallina | 40/531 |
| 2,494,453 | 1/1950 | Reck | 40/531 |
| 2,551,485 | 5/1951 | Boyd | 40/531 |
| 2,755,580 | 7/1956 | Justice | 40/531 |
| 3,484,970 | 12/1969 | Berlinsky et al. | 40/104 |
| 3,550,296 | 12/1970 | Castagna | 40/104 |
| 3,800,453 | 4/1974 | Kroes | 40/104 A |
| 3,939,587 | 2/1976 | Weststrom | 40/104 A |
| 4,102,071 | 7/1978 | D'Arcy | 40/531 |
| 4,121,361 | 10/1978 | D'Arcy | 40/470 |
| 4,160,334 | 7/1979 | Willis | 40/531 |
| 4,545,141 | 10/1985 | Ito et al. | 40/531 |

FOREIGN PATENT DOCUMENTS 348830  5/1931  United Kingdom .................. 40/531

*Primary Examiner*—Gene Mancene
*Assistant Examiner*—Wenceslao J. Contreras
*Attorney, Agent, or Firm*—William A. Henry, II

[57] ABSTRACT

An arrangement for turning the pages of a booklet within a copier. A air knife fluffer, the pages and a wheel is translated against the page to be turned and creates a buckle in the previously separated page. The vacuum wheel is then lifted bringing the page with it and rotated to flip the page. Afterwards, translation of the vacuum wheel without rotation continues in order to flatten the now flipped sheet. The vacuum is then returned to its home position.

22 Claims, 8 Drawing Figures

PAGE FLIPPER FOR BOOK COPYING

BACKGROUND OF THE INVENTION

Reference is hereby made to copending applications Ser. No. 811,195, entitled "Platen Transport and Vacuum Plenum for Book Copying" filed on Dec. 20, 1985, in the names of Gerald M. Garavuso and Troy Shinbrot; and Ser. No. 811,190, entitled "Frictionless Vacuum Feeder for Book Copying" filed on Dec. 20, 1985, in the name of Troy Shinbrot which are incorporated herein by reference.

This invention relates generally to an electrophotographic machine, and more particularly, concerns a page flipping apparatus for such a copying machine.

Present copier state of the art involves using a recirculating document handler to allow convenient copying of large stacks of original documents. These systems have no page turning arrangement to deal with copying books, magazines, saddle stitched sets, etc. Further, copying of bound documents is a labor intensive task making a device that is adapted to copy bound volumes more and more necessary to control costs, especially as finishing of copies into book volumes becomes more common. There is a clear present need to extend the state of the art to include this book copying segment of the market sector.

PRIOR ART

A number of page turner devices are available, however, they are usually designed to allow persons who are partially immobilized, disabled, or bed-ridden to turn pages of a book at will merely by operation of a switch. These devices are either too bulky, heavy, insufficiently reliable or incapable of being adapted to turn the pages of a book for book copying in a photocopying environment. For example:

U.S. Pat. No. 3,484,970 (Berlinsky et al.)—discloses an automatic sheet turner that uses a rotating vacuum head to grab a page of a book and flip it over to the other side. Subsequently, a brush follows the path of the roller and sweeps and smooths out the turned page.

U.S. Pat. No. 3,550,296 (Castagna) and U.S. Pat. No. 3,800,453 (Kroes)—disclose page turner devices in which suction means are used to lift the pages of a book and flip them over.

U.S. Pat. No. 3,939,587 (Weststrom)—discloses a page turner in which a roller is moved from one side of an open book to the other. The unturned pages of the book are kept in position by means of two page retainers.

U.S. Pat. No. 4,102,071 (D'Arcy)—discloses an automatic page turning apparatus in which a roller forces a page of a book to separate and bow upwardly. Once the page reaches a certain position, the roller releases the page which flexes upwardly to be engaged by a band as the band returns to it forward position. Subsequently, blocks move downwardly to force the page to a substantially flat position.

U.S. Pat. No. 4,121,361 (D'Arcy)—discloses an apparatus for automatically turning pages. A roller frictionally pushes an exposed page resulting in an upward bulging of the page, then a first flipper arm and a second flipper arm move under the bulge to assist in flipping the page over toward already turned pages.

U.S. Pat. No. 4,160,334 (Willis)—discloses a reversible page turner in which a roller causes the flipping of pages of a book.

SUMMARY OF THE INVENTION

Accordingly, a device for turning pages of a bound document set for automatic copying is disclosed as comprising a at least one fluffer jet for providing the initial separation of the pages and a vacuum wheel which picks up a thus separated page and moves laterally to create a buckle in the page. The wheel is then lifted bringing the page with it, and then rotated to flip the page. After flipping the page, the vacuum wheel then proceeds to press the now flipped sheet to a horizontal position.

BRIEF DESCRIPTION OF THE DRAWINGS

Other advantages of the present invention will become apparent upon reading the following detailed description and upon reference to the drawings, in which.

While the present invention will be described hereinafter in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
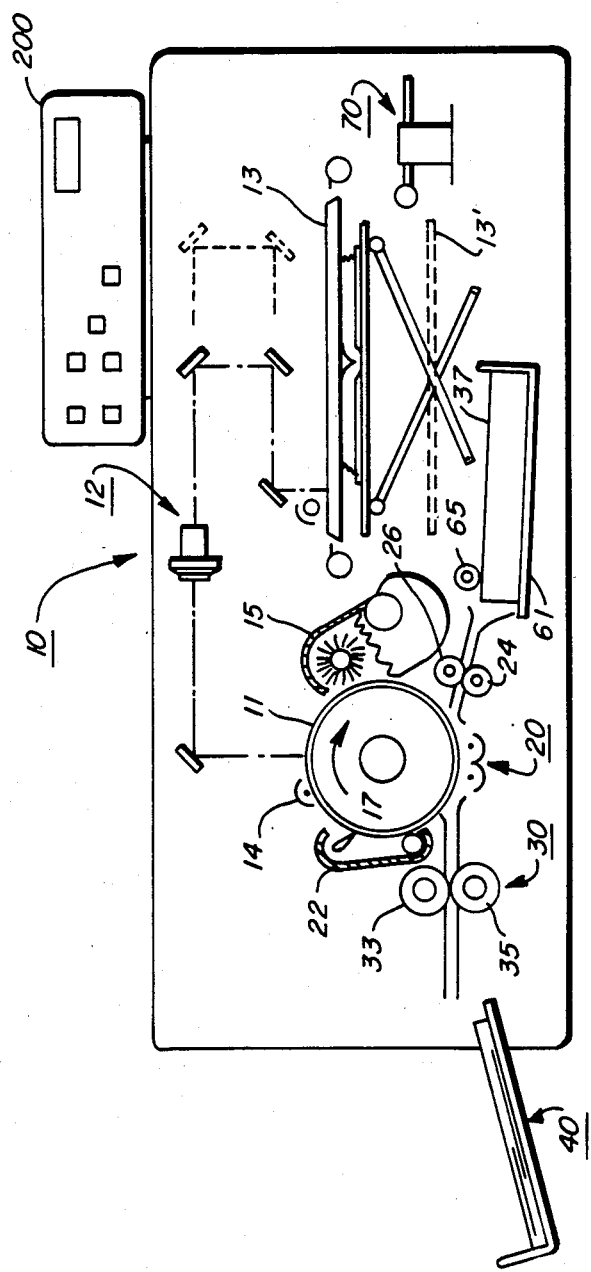
FIG. 1 is a schematic elevational view of an electrophotographic copying machine incorporating the features of the present invention.

For a general understanding of an electrophotographic copier in which the features of the present invention may be incorporated, reference is made to FIG. 1 which depicts schematically various components thereof. Hereinafter, like reference numerals will be employed throughout to designate identical elements. Although the apparatus for turning pages within a copier is particularly adapted for use in an electrophotographic copying machine of FIG. 1, it should become evident from the following discussion that it is equally well suited for use in a wide variety of areas and devices and is not necessarily limited in its application to the particular embodiment shown herein. For example, the apparatus of the present invention will be described hereinafter with reference to turning pages in a document for copying within a copier, however, the device could just as well be used for turning pages for reading by an individual who is disabled.

Since the practice of electrophotographic copying is well known in the art, the various processing stations for producing a copy of an original document are represented schematically in FIG. 1. Each processing station will be briefly described hereinafter.

As in all electrophotographic printing machines of the type illustrated, a drum or belt having a photoconductive surface 11 entrained about and secured to the exterior circumferential surface of a conductive substrate is rotated in the direction of arrow 17 through the various process stations. Photoconductive surface 11 may be made from selenium and the conductive substrate on which it is mounted is usually made of aluminum.

Initially, the drum rotates a portion of photoconductive surface 11 through a charging station that employs a corona generating device 16 to charge conductive surface 11 to a relatively high substantially uniform potential.

Thereafter, the drum rotates the charged portion of photoconductive surface 11 to an exposure station shown generally as 12 and includes a stationary, transparent platen, such as a glass plate 13 against which pages of a book to be copied are placed. Lamps (one shown) illuminate the original document. Scanning is achieved by translating the lamps and lens across the original document in timed relationship with movement of the photoconductive surface 11 so as to create incremental light images which are projected through an aperture slit onto the charged portion of photoconductive surface 11. Irradiation of the charged portion of photoconductive surface 11 records an electrostatic latent image corresponding to the informational areas contained within the original document.

The electrostatic latent image recorded on photoconductive surface 11 is now rotated toward developing unit 15 which includes a housing with a supply of developer mix contained therein. The developer mix comprises carrier granules with toner particles adhering triboelectrically thereto. Preferably, the carrier granules formed from a magnetic material with the toner particles being made from a suitable plastic. Developing unit 15 is preferably a magnetic brush development system. A system of this type moves the developer mix through a directional flux field to form a brush thereof. The electrostatic latent image recorded on the photoconductive surface 11 is developed by bringing the brush of developer mix into contact therewith. In this manner, the toner particles are attracted electrostatically from the granules to the latent image forming a toner powder image on photoconductive surface 11.

With continued reference to FIG. 1, a copy sheet is advanced by sheet feeding apparatus 60 to a transfer unit 20. Sheet feeding apparatus 60 advances successive copy sheets to registration rollers 24 and 26. Registration roller 24 is driven by a motor (not shown) in the direction of the transfer station and drives idler roller 26 as well as sheets 37 toward photoconductive surface 11 in timed relation to an image on the photoconductive surface 11.

Continuing now with the various processing stations, transfer station 20 includes a pair of corona means, one for transferring an image from photoconductive surfaced 11 to copy sheet 37 and the other for detacking the sheet 37 from photoconductive surface 11. For transfer, the corona generating device applies a spray of ions to the backside of the copy sheet. This attracts the toner powder from the photoconductive surface 11 to the copy sheet.

After transfer of the toner powder image to the copy sheet, the sheet is detacked from the photoconductive surface 11 and then advanced by suitable means to fuser apparatus 30.

Fuser apparatus 30 includes a fuser roll 33 and a backup roll 35 defining a nip therebetween through which the copy sheet passes. After the fusing process is completed, the copy sheet is advanced by suitable means to an output catch tray 40.

After the copy sheet is separated from photoconductive surface 11, some residual toner particles remain adhered thereto. These toner particles are removed from photoconductive surface 11 by a cleaning unit 22. Cleaning unit 22 includes a doctor blade that cleans the toner particles from the photoconductive surface 11.

It is believed that the foregoing description is sufficient for purposes of the present application to illustrate the general operation of an electrophotographic printing machine. Referring now to the specific subject matter of the subject invention, FIG. 2 depicts the page turner apparatus in greater detail.

Figure 2:
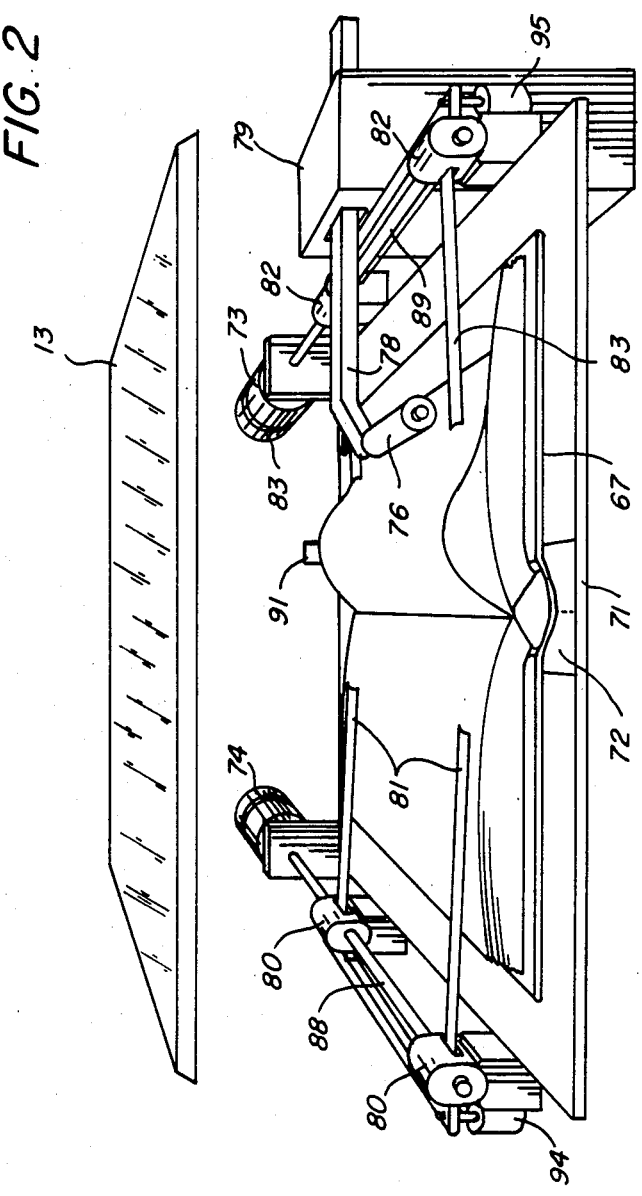
FIG. 2 is a partial enlarged perspective schematic of the page turner device of the present invention.

Referring now to FIG. 2, the detailed structure and operation of the present page turner apparatus 70 will be described. A platform 71 is shown in FIG. 2 supporting a bound volume book 67. The spine of the book is supported in a relieved surface 72 of platform 71. A rotatable vacuum wheel 76 is shown supported on a shaft 78 that is tiltably supported within a housing 79 for movement forward, and backward as well up and down by a conventional drive mechanism. A conventional drag brake (not shown) is attached to the vacuum wheel to control the rotation of the vacuum wheel. Reversible drive motors 73 and 74 are shown drivingly connected to housings 80 and 82 that support retractable fingers or page hold down means 81 and 83. Fingers 81 and 83 are controlled in a vertical direction by solenoids 94 and 95.

As shown in FIGS. 3A through 3F, bound volume 67 is supported by support platform 71 that is controlled for upward and downward movement by elevator mechanism 100. A book is initially placed open within copier 10 at a sufficient distance from platen 13 that vacuum wheel 76 can turn a page without interference from platen 13.

Figure 3A:
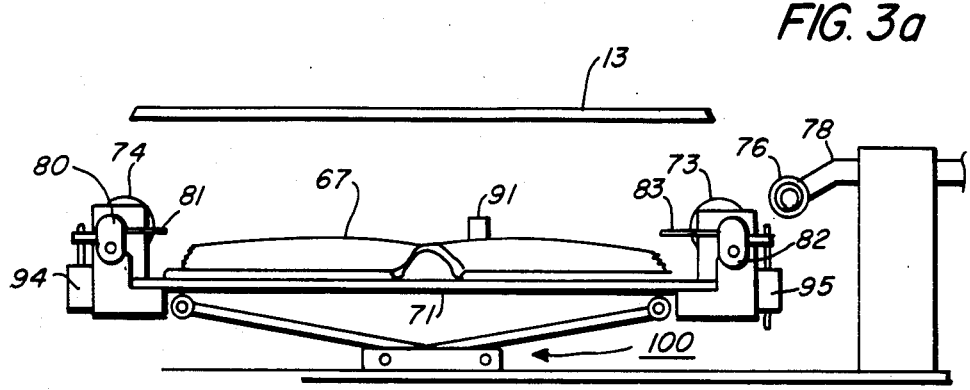
FIG. 3A is a partial elevational view of the page turner of the present invention showing the fluffing of the top page in a book prior to being acquired by a vacuum wheel as well as the platform which holds the book that is to be copied in their home positions.
Figure 3B:
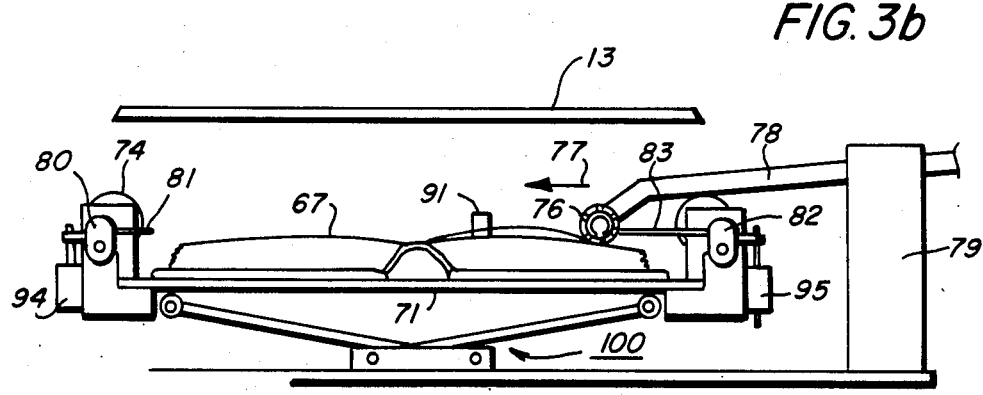
FIG. 3B shows the vacuum wheel of the present invention contracting a rased top page of the book without compressing it against the rest of the book and applying a buckle in the page.
Figure 3C:
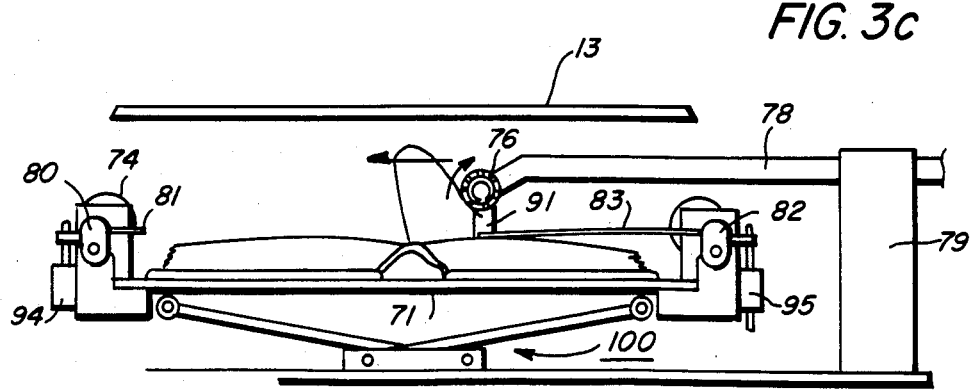
FIG. 3C shows the vacuum wheel of the page turner device of the present invention rotating in order to flip the page.
Figure 3D:
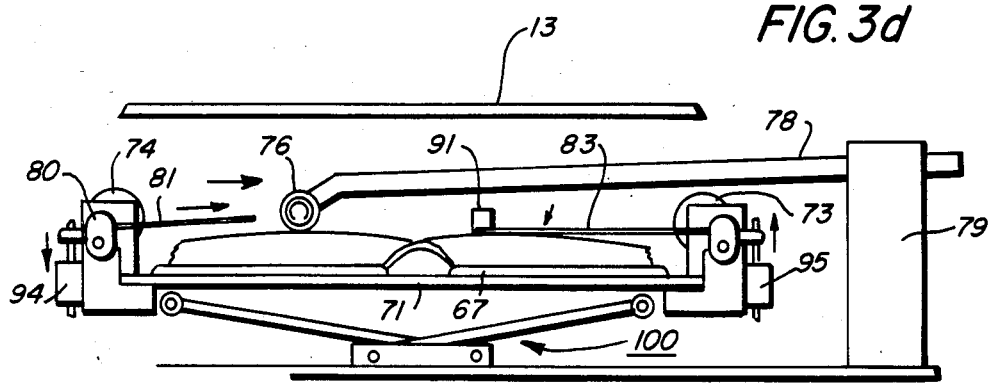
FIG. 3D is a side view of the page turner device of the present invention showing the vacuum wheel in the process of being retracted.
Figure 3E:
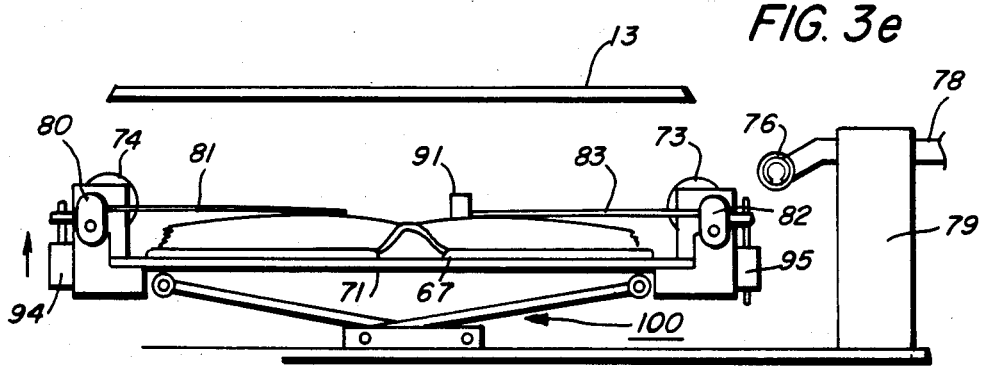
FIG. 3E is a side view of the page turner apparatus of FIG. 3D showing the vacuum wheel apparatus completely retracted and hold down devices placed on the open book.
Figure 3F:
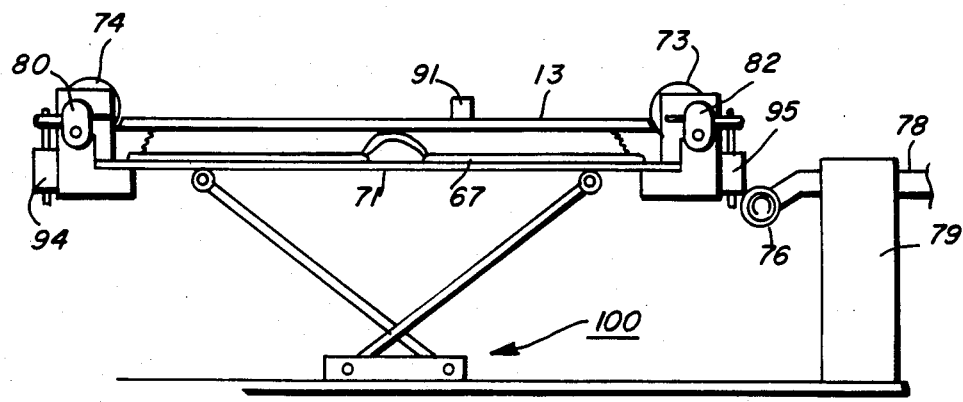
FIG. 3F is a side elevational view of the page turner apparatus shown in FIG. 2 with the book having been lifted up to the platen for copying purposes.

Initially, when a book is placed on platen 13, the page turner apparatus is in the position shown in FIG. 3A. When a signal is generated by the operator by way of a conventional microprocessor in console 200 for turning the first page, fluffer jet 91 is actuated in order to separate the first page in the book from the remaining pages and vacuum wheel 76 is translated forward and downward on shaft 78 toward the page by a conventional mechanism as shown in FIG. 3B. The vacuum roll 76 alights on the page to be turned, attracts the sheet thereto due to the negative pressure being applied within the roll, and is then translated in the direction of arrow 77 creating a buckle in the previously separated page. Once the buckle is formed, enhanced by at least one side air knife 91, the vacuum wheel is then lifted from the book and rotated in order to flip the captured page to the left hand side of the book. FIG. 3D shows vacuum wheel 76 in the process of flattening out the now flipped page. In the meantime, reversible drive motor 73 has played out a portion of fingers 83 such that they lie on top of the right hand side of the book in order to keep the pages secured. In addition, as vacuum wheel 76 is flattening out the now flipped page, reversible drive motor 74 is playing out finger portions 81 that will lie on top of the flipped page and secure it also. Fingers 81 and 83 are controlled for vertical movement by solenoids 94 and 95 that lift the fingers while they are playing out to their extended position and once the fingers are fully extended the solenoids are deactuated allowing the fingers to fall flat on top of the pages of the book. As shown in FIG. 3E, after the page has been flipped, vacuum wheel 76 is retracted to its rest position while the pages of the book are secured by fingers 81 and 83. In FIG. 3F, it is seen that elevator mechanism 100 under the control of the microprocessor in console 200 now lifts the book up to platen 13 for copying and as the elevator lifts the book the fingers 81 and 83 are retracted into their housings 80 and 82 in timed relation such that once the pages of the book contact the undersurface of platen 13 the fingers will be completely retracted within housings 80 and 82 by reversible drive motors 74 and 73. Copies of the two pages can now proceed by the translating scanning system as heretofore described. The scanning system is microprocessor controlled which is in turn controlled by the operator such that the scanning system can be adapted to copy the left side of the book only, the right side of the book only, the left and right sides of the book, or the left and right sides of the book without a seam showing just by making a selection on the console of the copier.

It is possible with the present invention to use the microprocessor to control the page turner such that different pages can be selected for copying. For example, sensors and counters could be mounted on the page turner device and used to sense the presence of pages and to count pages flipped in order to present for copying the desired pages. The microprocessor in console 200 could be of the type shown in U.S. Pat. No. 4,116,558 which is incorporated herein by reference.

In operation of one aspect of the present invention, a book is opened and placed within the copier and clamped by fingers 81 and 83 as shown in FIG. 2. Air knife 91 is actuated for page separation purposes and vacuum wheel 76 then contacts the page selected on console 200 and is translated with the new captured sheet toward the center spine of the book. Once a buckle appears in the page and most of the page has been removed from fingers 83, the vacuum wheel is lifted in a somewhat vertical direction while it is being driven clockwise. This lifting and rotation of the wheel continues until the edge of the captured page passes the wheel. After the edge of the page has passed, the wheel descends and with a drag brake on flattens the sheet onto the left side of the book. While this is taking place, clamped fingers 81 are removed from on top of the left side of the book in order for the page that has been turned to lie flat against the left side of the book. Vacuum wheel 76 with the drag brake on continues to flatten out the sheet and once it reaches the edge of the sheet, after the sheet has been flattened completely, the fingers 81 are then placed back on top of the sheet to maintain the sheet in that position.

The vacuum wheel is then returned to its home position as shown in FIG. 3A for turning of the next page. The book is now lifted by elevator mechanism 100 up against platen 13 while fingers 81 and 83 are being retracted in order for a copy of the booklet to be made. It should be understood that fingers 81 and 83 could be made of a transparent material and left on the book as it is being copied as opposed to being retracted for copying if one desired. Also, the flat fingers 81 and 83 could be replaced with fingers perpendicular to the open book if such would be more convenient. Fingers 83 not only serve to hold the right side of the book in place but also serve the additional function of flattening out any sheets that may have been captured somewhat by translation of the stalled vacuum wheel 76 as it was traversing from the right side of the book to the left side in order to flip the top page in the book.

It should now be apparent that a page flipper for book copying has been disclosed for turning pages of a bound document set for automatic copying. In the device, a vacuum wheel picks up a page after it has been separated from the rest of the pages by an air knife and moves it laterally to create a buckle in the page and after the buckle has appeared the wheel is lifted bringing the page with it and the wheel is then rotated to flip the page. After flipping the page the wheel descends and flattens the now flipped page before returning to its original starting position. Since various modifications are contemplated, it is to be understood that within the scope of the appended claims, the invention may be practiced otherwise than is specifically described.

What is claimed is:

1. A method for flipping pages in a book for copying, comprising the steps of;
   (a) fluffing the pages to be turned;
   (b) contacting and capturing a fluffed page with a vacuum roll;
   (c) translating the vacuum roll in order to form a buckle in the captured page;
   (d) lifting the vacuum roll;
   (e) rotating the vacuum roll while it is being lifted until the captured page passes the vacuum roll;
   (f) then descending the vacuum roll while continuing to translate the same until the page is flattened; and
   (g) returning the vacuum roll to its original position.

2. The method of claim 1, including the step of securing the page before and while it is being translated by the vacuum wheel.

3. The method of claim 1, including the step of delaying the lifting of the vacuum roll until a substantial buckle has been formed in the page.

4. The method of claim 2, wherein said securing of the page is accomplished by the use of finger means.

5. The method of claim 4, wherein said finger means are moveable between page hold down and non-hold down positions.

6. The method of claim 5, including the step of controlling said finger means in a horizontal plane with reversible motors.

7. The method of claim 6, including the step of controlling said finger means in a vertical plane with solenoids.

8. The method of claim 1, including the step of lifting the book into contact with a platen for copying.

9. The method of claim 4, wherein said finger means are adapted to prevent the turning of more than one page at a time.

10. A method for flipping pages in an open book for copying, comprising the steps of:
   (a) providing a platform for supporting the book;
   (b) providing a predetermined space between the platform and a platen;
   (c) fluffing the pages of the book in order to separate the pages;
   (d) contacting and capturing a page in the book with a stalled vacuum wheel;
   (e) moving the vacuum wheel toward the center of the book in order to form a buckle in the captured page;
   (f) lifting the vacuum wheel after a buckle has been created in the captured page;
   (g) rotating the vacuum wheel while it is being lifted until the captured page passes the vacuum wheel;
   (h) then descending the vacuum wheel while moving it away from the center of the book in order to flatten the now turned page;
   (i) returning the vacuum wheel to its starting position; and
   (j) lifting the platform until the pages of the open book come into contact with the underside of the platen for copying purposes.

11. The method of claim 10, including the step of providing hold down means for securing the pages in the open book while a page is being turned and while the platform is being lifted.

12. The method of claim 11, wherein said hold down means comprises retractable fingers.

13. The method of claim 12, wherein said retractable fingers are controlled by at least one reversible motor.

14. A copier including a device for turning pages of an open book for copying, comprising;
   platen means;
   platform means for supporting the open book in a first position within said copier removed from said platen means,
   hold down means adapted for positioning on top of the exposed pages of the open book to secure the pages against movement;
   vacuum wheel means adapted to be positioned on top of at least the page of the book to be turned and to capture that page once a negative pressure is applied thereto, said vacuum wheel means being adapted for movement initially in a substantially horizontal plane, then in a substantially vertical plane, then back into said substantially horizontal plane; and
   elevator means adapted to lift said platform means until the pages of the open book contact the underside of said platen.

15. The copier of claim 14, wherein said vacuum wheel means includes a vacuum wheel that is rotatable and a vacuum plenum that is always pointing down.

16. The copier of claim 15, wherein the rotation of said vacuum wheel is controlled by a drag brake.

17. The copier of claim 14, wherein movement of said vacuum wheel in said horizontal plane creates a buckle in the captured page.

18. The copier of claim 17, wherein movement of said vacuum wheel in said substantially vertical plane lifts the captured page.

19. The copier of claim 18, wherein said vacuum wheel is rotated as it is moved in said substantially vertical plane in order to drive the captured page past said vacuum wheel.

20. The copier of claim 19, wherein movement of said vacuum wheel in said substantially horizontal plane after movement in said substantially vertical plane has taken place causes the now flipped page to be flattened against the opposite side of the open book.

21. The copier of claim 20, wherein rotation of said vacuum wheel is inhibited by a drag brake.

22. The copier of claim 20, wherein movement of said vacuum wheel in said substantially horizontal plane returns said vacuum wheel to its original starting position.

* * * * *